Figure 1:
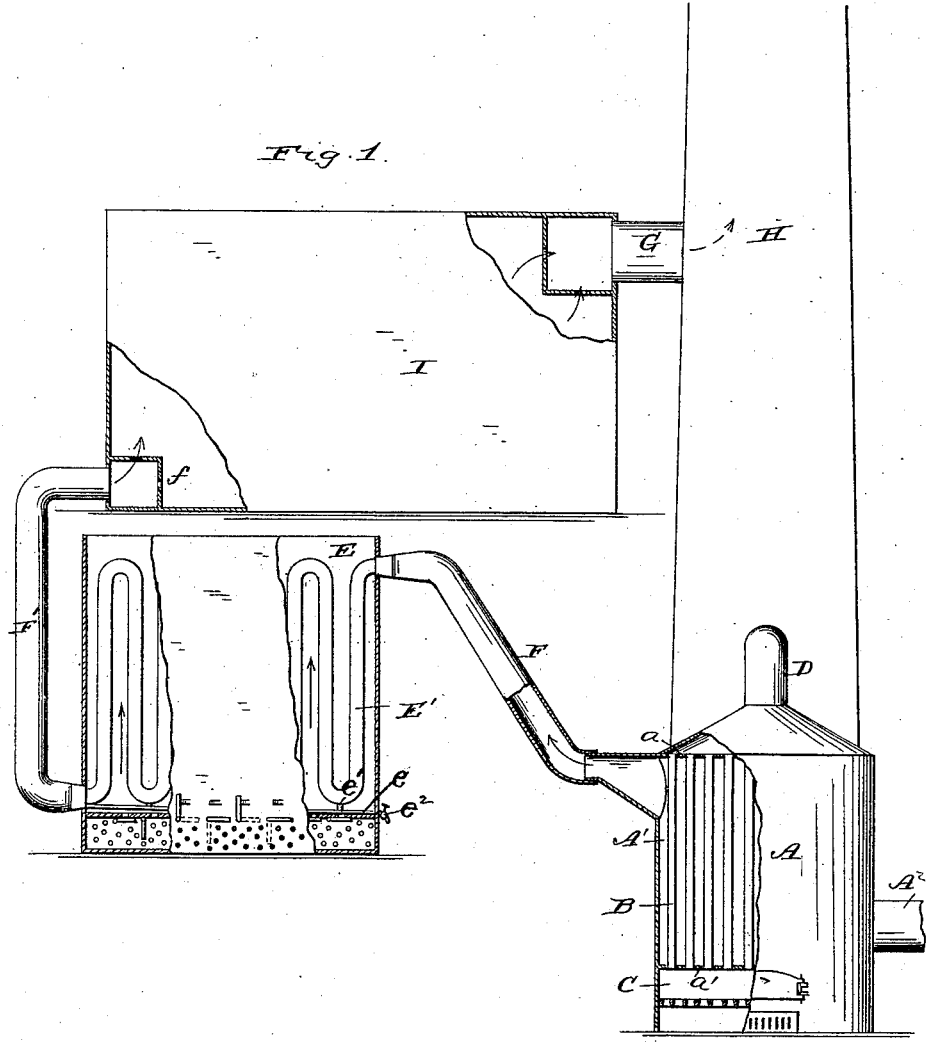

(No Model.) 2 Sheets—Sheet 1.

R. S. JENNINGS.
AIR DRYING APPARATUS AND PROCESS.

No. 303,574. Patented Aug. 12, 1884.

Witnesses
N. W. Low
J. S. Barker.

Inventor
Ralph S. Jennings
by Doubleday & Bliss
atty.

(No Model.) 2 Sheets—Sheet 2.
R. S. JENNINGS.
AIR DRYING APPARATUS AND PROCESS.
No. 303,574. Patented Aug. 12, 1884.
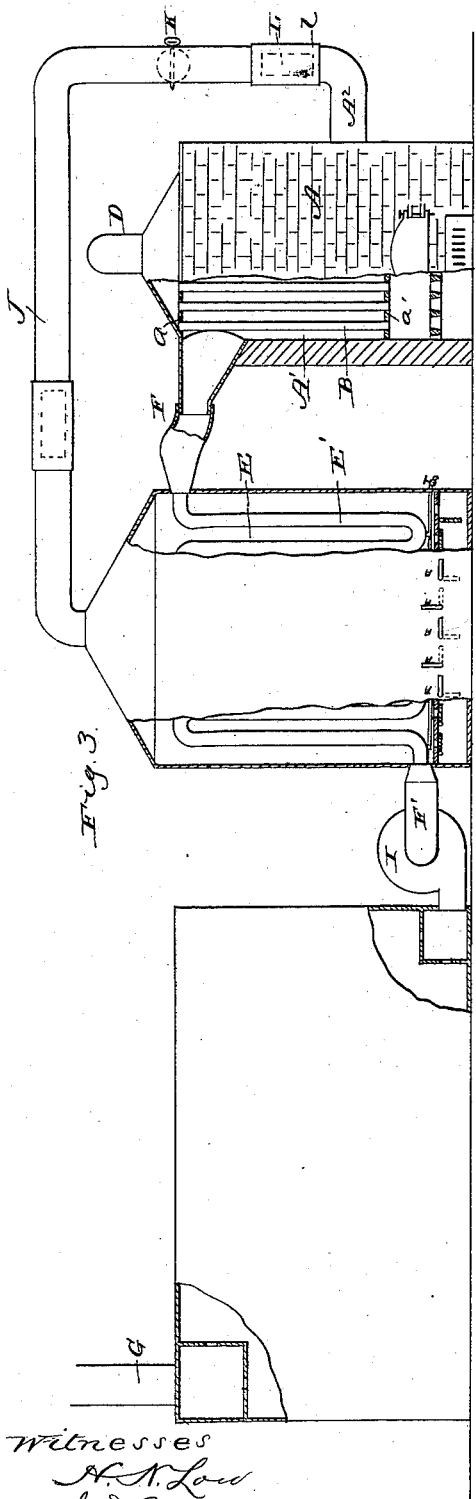
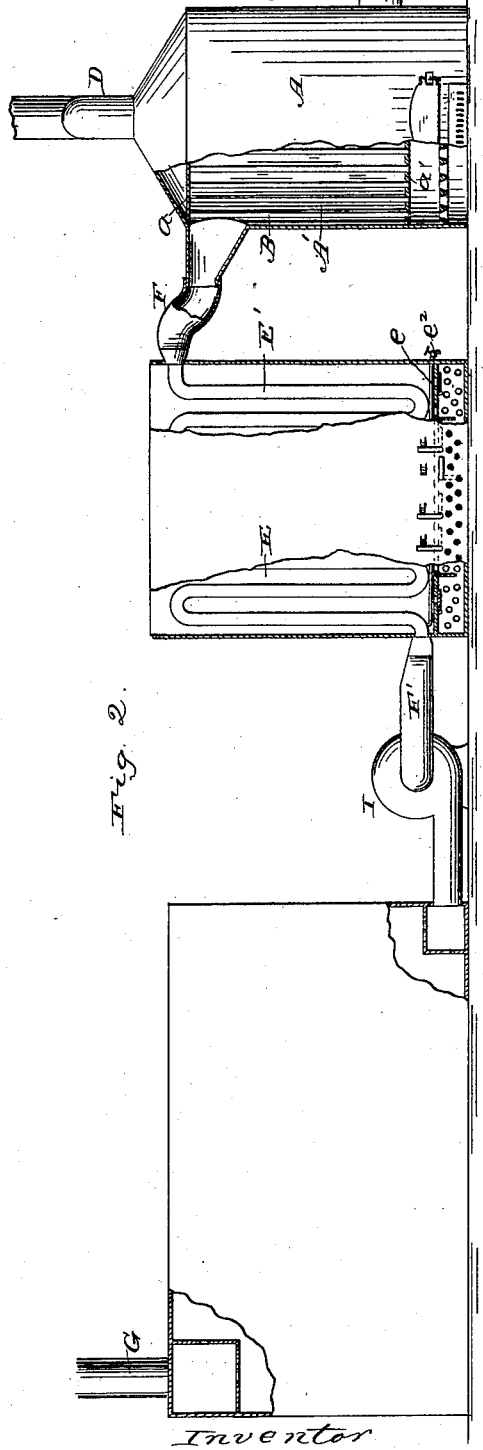
Witnesses
H. N. Low
J. S. Barker
Inventor
Ralph S. Jennings
by Doubleday & Bliss attys

UNITED STATES PATENT OFFICE.

RALPH S. JENNINGS, OF BOSTON, MASSACHUSETTS.

AIR-DRYING APPARATUS AND PROCESS.

SPECIFICATION forming part of Letters Patent No. 303,574, dated August 12, 1884.

Application filed February 23, 1883. (No model.)

*To all whom it may concern:*

Be it known that I, RALPH S. JENNINGS, a citizen of the United States, residing at Boston, Suffolk county, Massachusetts, have invented certain new and useful Improvements in Air-Drying Apparatus and Processes, of which the following is a specification, reference being had therein to the accompanying drawings.

This invention relates to an improved process for treating air in large volumes, in order to lower its relative humidity and at the same time permit its being used at a low temperature for drying articles, which, in the arts as heretofore practiced, it has been impossible to use successfully, except under favorable conditions of the atmosphere and sunlight, and whereby also the operation of drying at a high artificial heat may be greatly facilitated.

Attempts have been made to remove the moisture from air by passing it in contact with hygroscopic agencies—such as sulphuric acid, lime in its various forms, &c.; but these dehydrating agents are of an objectionable character, as the air is more or less impregnated with vapors and noxious matters, so that it cannot be brought into contact with articles of food to dry them without danger of imparting to them more or less of said objectionable matters. Therefore, it is a great desideratum to be able to lower the relative humidity of the air by a purely mechanical process, so that it shall be unaffected, except in the fact that the humidity is brought to so low a degree as to increase its avidity for water.

Heretofore unsuccessful attempts have been made to remove moisture from the air, while the latter was at its normal temperature by moving it into contact with cold bodies or surfaces. This process is not practicable during a large part of the year when the air is so low in temperature as to be comparatively near the temperature of the water or other ordinary condensing agent. When the temperature is low, as it is during many weeks of the year, it is impracticable to remove any material amount of the moisture therefrom by bringing it into contact with surfaces cooled by water, the water and the air being, as aforesaid, so nearly of the same temperature that the former cannot destroy the avidity of the latter for the moisture which it contains. The best effects are produced when there is a wide difference between the temperatures of the cooling agent and that of the moisture in the air, especially if the temperature of the cooling agent be considerably below the dew-point of the heated air. I first raise the temperature of the air to a sufficiently high degree and then compel it to pass through a duct or suitable guideway into contact with a cooling agent, which latter may be water or a surface cooled by ice; or even air at the normal temperature can be used as the cooling means. By employing the latter, the cooling of the heated air can be effected at the very minimum of cost, although if a cooling agent be employed with a temperature considerably lower than that of the normal air at the time of the operation the result will be still more advantageous.

Heretofore moisture has been incidentally removed from air by means of air-compressors, which initially effect a reduction in the volume of the air, the main purpose being to obtain cold air by a subsequent expansion, and in some of the appliances used for this purpose there has been, as said, an incidental condensation of part of the moisture. I do not wish to be understood as claiming this process; but I have found that it is practically impossible to make this process available for the purposes to which my invention is applicable; but a comparatively small volume of air can be treated by the compressing system. The manner by which this process is carried on is very expensive, even when thus capable of providing only a small volume of heated air. For many of the results at which I aim it is necessary to produce a volume of from three thousand to twenty thousand cubic feet of heated air a minute, and while my process is practically available for this, those heretofore followed are not practical.

To those for whose use my invention is especially provided—viz., parties interested in the drying of fish and many other articles on a small scale—the expense of a "plant" of air-compressing machinery is a great obstacle. That which has been heretofore merely incidental in air-compressors, &c., is in my case the main object—that is to say, I aim to lower the relative humidity of a large volume of air, and accomplish it by first raising the temperature of the air and of the moisture and then bringing them into contact with a cooling agent, which may, by my method, be merely a current of air not lower in temperature than the normal. By performing these operations of first raising the temperature of the air and then drawing it into contact with a cooling agent in a closed duct or apartment, or a series of apartments joined properly by ducts, I can keep under control the temperature, the movement of the air, and the cooling means, and, moreover, can apply the air at any desired point or in any preferred way after it has been dried and tempered.

I am aware of the fact that a continuous current of air has been used in a drying apparatus, said currents of air being heated in the bottom of the dry-room; then, after being heated, passing to the materials above in the room, there absorbing the moisture from said materials and then passing out to devices for removing the moisture.

The method of operation of these devices has been applied also in numerous other ways, all of which, however, have the characteristic features above specified; but my process is widely different from those carried out, by means arranged and operating thus: These drying devices heretofore used have not aimed at, nor have they effected, any material reduction of the relative humidity of the air, the means employed simply operating to first surcharge the air with moisture—that is to say, add to it moisture above its normal humidity—and subsequently remove this normal moisture by condensation. The moisture removed is that which the air has been induced to take up by the fact that it was heated just before coming in contact with the materials to be dried, the heater being at the bottom of the dry-room. This latter matter is one also of disadvantage, in that the heat affects the material in the room, whereas in my case the materials in the dry-room can be kept at as low a point as is necessary. In fact, under some circumstances the cooler can be located in the drying-room without departing from my invention. Under unfavorable circumstances the conditions of the atmosphere may be such as not to permit the condensation of the moisture; but even at such times there is a great advantage in treating the air in the manner which has been described—that is to say, in first heating it and subsequently cooling it—for, regardless of the matter of condensation, there is an assurance, by following this course, that every particle of the air shall be thoroughly heated, and that the temperature of the whole mass shall be uniform throughout, and then, by subsequently cooling it, it can be brought down to the temperature at which it is necessary to use it, especially in drying delicate materials. The air is thoroughly and uniformly heated, and at the same time can be brought to its work at a sufficiently low temperature, whereas when heating alone is depended on there is danger either of carrying it to too high a degree, or, (if not carried to a high degree) there is danger of not having it all uniformly heated, both of which objections are avoided in following the process herein described of first heating and then cooling. Therefore, I do not wish to be limited to the mere condensation of moisture from the air so long as the remaining features of the process and apparatus are adhered to. Nor do I wish to be limited to any special form of mechanism for carrying the process into effect, though I have shown in the drawings forms of mechanism which I have found to be very efficient for this purpose.

Figure 1 is a view, partly in side elevation and partly in section, of devices adapted to carry out my improved process; and Figs. 2 and 3 show modified forms.

A represents a furnace, which may be of any suitable character, adapted to accomplish the purposes at which I aim. I have shown one form in which a sheet-metal jacket or casing is employed, and in Fig. 3 another form is shown having a brick or masonry casing or jacket. Within the furnace-casing or outer wall there is arranged a series of pipes, B B, shown as being supported at the top and bottom in diaphragms $a$ $a'$. The hot air and products of combustion from the furnace-chamber C pass upward through the tubes B, and are carried off through a suitable exhaust or exit, D. Around the tubes or pipes there is formed a chamber, A', in which air can be heated to a high degree, said air being supplied to the chamber through an inlet, $A^2$. After being heated the air passes through the duct F to a chamber, E, the passage of the air in the construction shown in Fig. 1 being caused by its tendency to rise after being heated.

Within the chamber E there is arranged a duct or series of ducts, E', through which the air passes after entering from the duct F. As shown in the drawings, the duct or ducts E' are arranged in the form of a coil or coils, so that the air is compelled to pass in contact with a large surface. The chamber E permits an upward passage of air at the normal temperature, which, coming in contact with the outer faces of the coil or coils of pipe, keeps them cool and causes a cooling of the moisture, if any should be contained in the heated air, said heated air being also cooled in its passage through the duct or ducts E'. Instead of a coiled tube or tubes, E', use may be made of straight tubes situated across the chamber; or the air may be delivered into the chamber directly, and the upwardly-rising cooling air may be caused to pass through vertically-arranged tubes or through a coil of tubes in the chamber. The air in the furnace can be heated to or above 2,000° Fahrenheit. When the apparatus is used as described in my application No. 65,006, this produces a decomposition of the moisture; but in carrying out the present process a lower temperature will suffice, and even the decomposition of moisture (if aimed at) will occur at a much lower temperature when the air is largely charged with it; but in the present case, if the air be passed to the cooler after being heated, the relative humidity will be found under most circumstances to be reduced to ten per cent. of that of the normal air at the time of the operation. The air escapes from the cooler through duct F' to the dry-room. I have shown a dry-room having a receiving-chest at $f$, provided with apertures to distribute the air, and having also an exhaust-duct, G. In Fig. 1 this duct G communicates with the chimney H, through which pass the products of combustion from the furnace A. If water of condensation collects in the ducts, E', it can be withdrawn by pipe $e$, having branch pipes $e'$, and a stop-cock or valve, $e^2$.

In Fig. 2 I have shown, substantially, the same apparatus so far as the furnace, the cooler, and the drying-room are concerned, there being shown as combined with them, however, in this case, a fan, I, which can be caused to suck the air through the furnace and cooling apparatus, blowing it into the dry-room. This form of construction is preferable for some reasons, for when a fan is employed the other parts can be arranged upon one floor or level; and, moreover, the fan can be caused to deliver a far greater volume of air than can be made available by ordinary appliances when the natural circulation of the air is depended upon. However, where rapid drying is not desired, an apparatus of the character shown in Fig. 1 will be advantageous and cheaper, in that no power is required for the operation of the fan.

In Fig. 3 the same apparatus is shown as that illustrated in Fig. 2, except that I have in said Fig. 3 illustrated an efficient means of utilizing the air which rises in the cooler, said air being carried by a duct, J, to the heating-chamber around the tubes B. In this case the air is partially heated in the cooling apparatus and the raising of its temperature in the furnace to a higher point is facilitated; but if for any reason it is desired to cut off this supply of air, this can be effected by means of a damper at K, and air can be supplied to the furnace-chamber through an apparatus at L, there being for said aperture a door or slide or equivalent means for closing it, as shown at $l$.

Now, it will be seen that in my process the air is subjected to a "direct" heating action—that is to say, is heated by agencies which raise the temperature of the air to any desired point without lessening the bulk of the air at the heating stage, in contradistinction to the refrigerating and other machines in which air has been reduced in volume as one of the steps.

The great practical advantage which I attain arises from the fact that I can deliver immense volumes of air rapidly from which the moisture is removed, and the process is much cheaper and more rapidly carried out than those heretofore followed, even if only a portion of the moisture be withdrawn, as the immense volume and rapid movement of the air more than make up for any loss in this respect.

I do not in this application claim any of the features of the process or mechanism herein set forth relating to the removal of moisture from the air by a decomposition thereof by means of hot plates—that is to say, relating to the process which can be effected if the tubes in the furnace be heated to a high degree. When the metallic surfaces are thus heated high enough, the oxygen of the moisture will be withdrawn to form an oxide upon the metallic surfaces, resulting in a drying of the air. That process, however, I regard as entirely separable from the one forming the subject-matter hereof, and therefore I prefer to make the former the subject-matter of another application, (Serial No. 65,006,) which was filed heretofore, to wit, on the 23d day of June, 1882.

I do not claim herein anything except what is specifically set forth in the claims hereof, reserving to myself the right to claim all other patentable subject-matter herein shown and described in the aforesaid application, No. 65,006.

I have above alluded to the fact that use has been made of such hygroscopic agencies as sulphuric acid, lime, &c., in their various forms for the purpose of treating air. One apparatus to my knowledge employing such agencies has contained the following devices, namely: means for first heating air, then passing it through lime, then passing it through a chamber containing water-pipes, and then again passing it through lime or other similar substance to disinfect the air, and I do not claim such process or apparatus as my invention; but it is well known to those acquainted with the matter of drying that the use of these hygroscopic agents—such as lime, sulphuric acid, &c.—are very objectionable, not only on account of the fact that they tend to charge the air with particles of a character such that they are deleterious when coming in contact with particles of food and other delicate materials to be dried, but also from the fact that their use renders it impossible to treat large volumes of air rapidly, for the latter cannot be forced through these hygroscopic materials by any known means, except upon a scale so small that the apparatus is not efficient for drying purposes. In my case the air is heated not merely for the purpose of affecting the spores of organic matter which may be therein contained, but is so heated with reference to the ultimate temperature attained after it has passed through the cooler that the humidity of the air shall be at such a point that it can effect a rapid drying at a comparatively low temperature, and after leaving the heater it is carried not through a mass of lime or other hygroscopic material, but it is taken in the condition in which it leaves the furnace directly to the cooler, and in the condition in which it leaves the cooler is taken directly to the drying-room, so that by this process there are no particles of deleterious matter taken up to affect the food or whatever other material is being dried.

I do not herein claim any of the processes, devices, or combinations which form the subjects-matter of any of the claims, respectively, in my pending applications Nos. 65,006, 73,148, 86,318, 86,319, 87,468, 87,469, 97,493, 98,699, and 106,832.

I do not herein claim the combination of the air-heater, the air-cooler, the latter having two separated chambers or ducts, a duct which carries the air from one of the chambers or ducts in the cooler to the furnace, and a duct which carries the air from the furnace to the other of the said chambers or ducts in the cooler, but reserve to myself the right to claim that subject-matter in another application.

What I claim is—

1. The herein-described process of treating air to be used in drying, it consisting in first subjecting the air outside of the said drying-room to the direct action of a heater before coming into contact with the materials to be treated, then carrying the air through an unobstructed duct in the condition in which it leaves the heater directly into contact with cooling-surfaces outside of the heater, then delivering the air, after being sufficiently cooled, directly into the apartment where the articles are being dried, substantially as set forth.

2. The herein-described process of treating air to be used in a drying-room, it consisting in subjecting it while outside of the drying-room to the direct action of a heater, then carrying it through an unobstructed duct in the condition in which it leaves the heater directly into an apartment outside of the heater, cooling it in the last said apartment, then delivering the air, after being sufficiently cooled, directly into the apartment where the articles are being dried, the heating and the cooling being effected in the order specified, and before the air enters the drying-room, substantially as set forth.

3. The herein-described process of treating and directing air to be used in drying, it consisting in compelling said air, by suction or exhaust mechanism, to pass first into contact with a heater, then to a cooler, then to an inclosed apartment, and thence into the open air, substantially as set forth.

In testimony whereof I affix my signature, in presence of two witnesses, this 3d day of February, 1883.

RALPH S. JENNINGS.

Witnesses:
H. H. BLISS,
HENRY H. PAGE.